(12) United States Patent
Loibl

(10) Patent No.: US 11,981,273 B2
(45) Date of Patent: May 14, 2024

(54) ELECTRIC MOTOR FOR OPERATING SWITCH ELEMENTS FOR AUTOMATIC TRANSMISSION AND SYSTEM HAVING ELECTRIC MOTORS OF THIS KIND

(71) Applicant: ZF Friedrichshafen AG, Friedrichshafen (DE)

(72) Inventor: Josef Loibl, Bad Abbach (DE)

(73) Assignee: ZF Friedrichshafen, Friedrichshafen (DE)

( * ) Notice: Subject to any disclaimer, the term of this patent is extended or adjusted under 35 U.S.C. 154(b) by 750 days.

(21) Appl. No.: 16/977,773

(22) PCT Filed: Feb. 6, 2019

(86) PCT No.: PCT/EP2019/052819
§ 371 (c)(1),
(2) Date: Sep. 2, 2020

(87) PCT Pub. No.: WO2019/170341
PCT Pub. Date: Sep. 12, 2019

(65) Prior Publication Data
US 2020/0398771 A1 Dec. 24, 2020

(30) Foreign Application Priority Data
Mar. 5, 2018 (DE) ..................... 10 2018 203 235.1

(51) Int. Cl.
*B60R 16/023* (2006.01)
*F16H 61/02* (2006.01)
(Continued)

(52) U.S. Cl.
CPC ..... *B60R 16/0231* (2013.01); *F16H 61/0204* (2013.01); *F16H 61/12* (2013.01);
(Continued)

(58) Field of Classification Search
CPC ............... B60R 16/0231; B60R 16/005; F16H 61/0204; F16H 61/12; F16H 61/32;
(Continued)

(56) References Cited

U.S. PATENT DOCUMENTS 6,188,190 B1 * 2/2001 Arakawa ................ G05B 19/41
318/560
9,588,508 B2 * 3/2017 Sasaki .................... G05B 19/18
(Continued)

FOREIGN PATENT DOCUMENTS

DE 10 2006 030 270 A1 1/2007
DE 10 036 601 A1 1/2009
(Continued)

OTHER PUBLICATIONS

A16 Search Report issued in German Patent Application No. DE 10 2018 203 235 dated Nov. 26, 2018 (12 pages).
(Continued)

*Primary Examiner* — David Luo
(74) *Attorney, Agent, or Firm* — Crowell & Moring LLP

(57) ABSTRACT

The invention relates to an electric motor for operating shift elements in an automatic transmission for a vehicle that has an actuator for operating the electric motor mounted thereon. The actuator can be coupled to a data bus for communication. The actuator also has a communication module for communicating with at least one other actuator that can be coupled to the data bus for communication in at least one other electric motor.

8 Claims, 1 Drawing Sheet

(51) Int. Cl.
*F16H 61/12* (2010.01)
*F16H 61/32* (2006.01)
*F16H 63/30* (2006.01)

(52) U.S. Cl.
CPC ............ *F16H 61/32* (2013.01); *F16H 63/304* (2013.01); *F16H 2061/1224* (2013.01)

(58) Field of Classification Search
CPC ........... F16H 63/304; F16H 2061/1224; F16H 61/0006; F16H 59/044
USPC .................................................. 318/255, 558
See application file for complete search history.

(56) References Cited

U.S. PATENT DOCUMENTS

| | | | | |
|---|---|---|---|---|
| 10,186,992 | B2 * | 1/2019 | Zhao | .................. H02P 6/04 |
| 2007/0296372 | A1 * | 12/2007 | Hori | .................. H02P 1/163 |
| | | | | 318/716 |

FOREIGN PATENT DOCUMENTS

| | | |
|---|---|---|
| DE | 10 2008 061 564 A1 | 7/2009 |
| DE | 11 2008 001 195 T5 | 3/2010 |
| DE | 10 2010 033 836 A1 | 3/2011 |
| DE | 199 04 021 A1 | 5/2013 |
| DE | 10 2014 218 115 A1 | 3/2016 |
| DE | 10 2015 226 351 A1 | 6/2017 |
| DE | WO 2017/153174 A1 | 9/2017 |
| DE | 10 2018 203 235 A1 | 9/2019 |
| WO | WO 2009/041679 A1 | 4/2009 |
| WO | WO 2009/082994 A1 | 7/2009 |
| WO | WO 2011/026457 A1 | 3/2011 |
| WO | WO 2019/170341 A1 | 9/2019 |

OTHER PUBLICATIONS

International Search Report (including English translation) and Written Opinion from PCT/EP2019/052819 dated May 6, 2019 (13 pages).
IPER issued in PCT/EP2019/052819 on Feb. 13, 2020 (7 pages).
IPER issued in PCT/EP2019/052819 on Jul. 10, 2020 (14 pages).

* cited by examiner

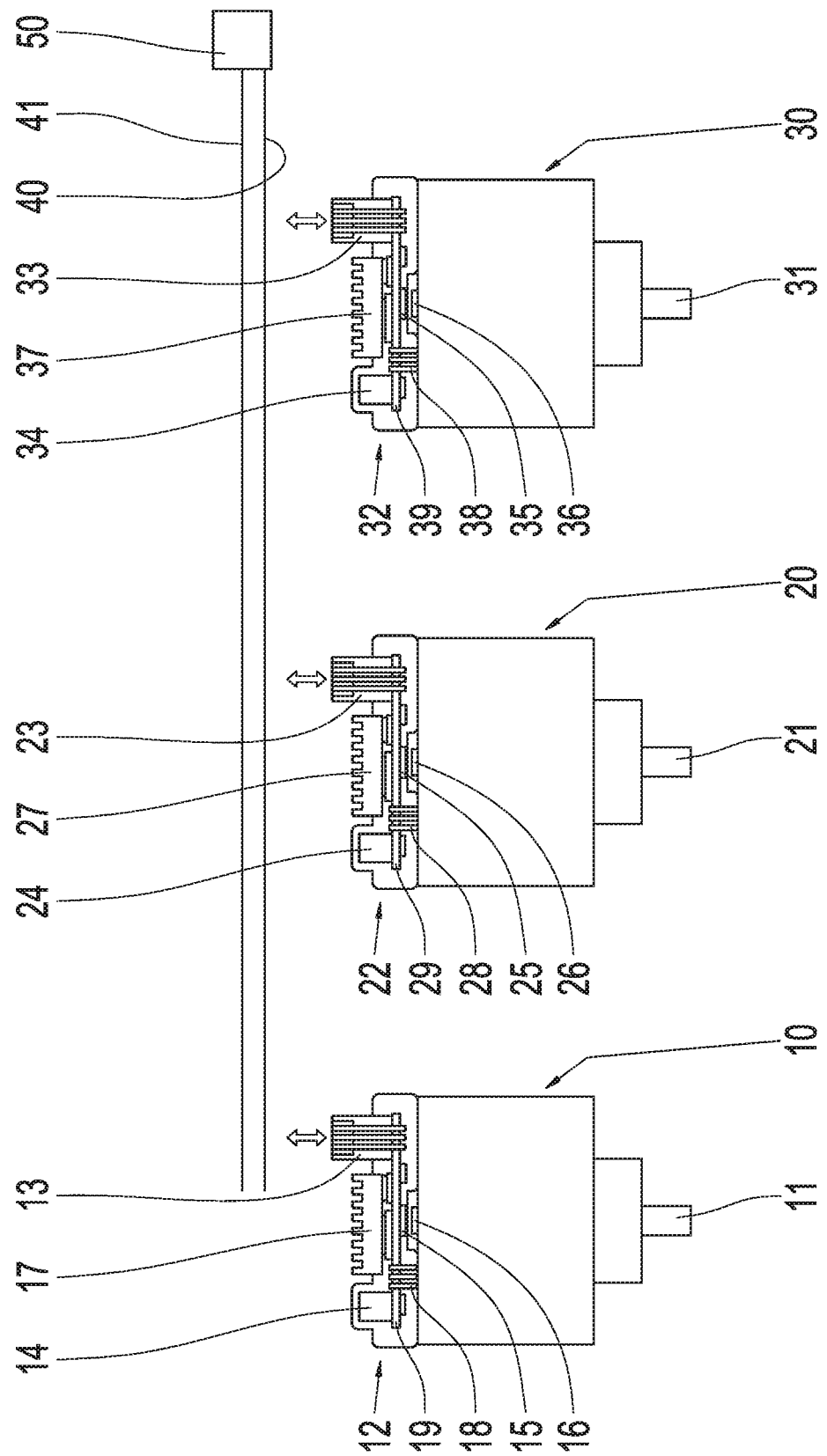

ELECTRIC MOTOR FOR OPERATING SWITCH ELEMENTS FOR AUTOMATIC TRANSMISSION AND SYSTEM HAVING ELECTRIC MOTORS OF THIS KIND

CROSS-REFERENCE TO RELATED APPLICATIONS

This application is a U.S. national stage application under 35 U.S.C. § 371 of PCT Application No. PCT/EP2019/052819, filed on Feb. 6, 2019, and published as WO 2019/170341 A1 on Sep. 12, 2019, which claims priority from German Application No. DE 10 2018 203 235.1, filed on Mar. 5, 2018, the entirety of which are each hereby fully incorporated by reference herein.

The present invention relates to an electric motor for operating shift elements for automatic transmissions that are used in vehicles. The invention also relates to a system that has electric motors of this kind. The invention is aimed in particular at a concept that involves electric motors for operating shift elements for automatic transmissions with distributed intelligence.

In known automatic transmissions, which can be designed as double clutch transmissions, valves or pressure regulators are normally used for operating shift elements. Automatic transmissions have also been developed in the past that use electric motors as operating elements, e.g. in the form of brushless DC motors. There are operating elements in these, in which control electronics and one or more electric motors are used for operating the shift elements. There are also designs for automatic transmissions from the prior art containing numerous brushless DC motors and a central control unit that activates each of the motors via a communication system.

According to one embodiment, an electric motor is proposed for operating shift elements in an automatic transmission for a vehicle. The electric motor can have an actuator mounted on it for activating the electric motor, which can be connected for communication with a data bus. The actuator can contain a communication module for communication with at least one other actuator that can be coupled to the data bus for communication in at least one other electric motor.

The electric motor can be designed as a brushless DC motor. Other designs of the electric motor are likewise conceivable. The shift element can be an element in the automatic transmission that participates in a gear shifting in the automatic transmission. In particular, the shift element can be a shift fork, or the shift element can be a clutch or an element that operates the clutch.

The automatic transmission on which the electric motor can be used can be designed as a double clutch transmission with two or more gear stages. Other designs of the automatic transmission are conceivable as long as a shift element is used for shifting between gear stages in the automatic transmission. The vehicle on which the embodiment is used can be any vehicle in which an automatic transmission is provided for transferring a drive force from a drive source to wheels or the like. By way of example, the vehicle can be designed as a work machine for agricultural work, a forestry machine, or some other type of self-driving machine, or it can be a passenger vehicle.

The data bus can be a CAN bus, CAN-FD bus, FlexRay bus, or an Ethernet bus. These data busses are known from the prior art and can be used in the present embodiment as long as communication can take place via the data bus. The actuator mounted on the electric motor can be a separate unit, containing electronic elements, e.g. a processor, memory, interface, etc. The elements can be mounted on a printed circuit board encased in a housing. The housing can be designed such that it protects the printed circuit board and the elements thereon from external effects, e.g. caused by moisture or dust. The communication module can be a module in the actuator that can exchange data with the data bus in order to transmit data, signals, or other information. The communication module can be configured to convert data, signals or other information in the actuator such that they can be transmitted via the data bus and further processed. The second actuator that can be coupled to the data bus for communication can be identical to the actuator for the electric motor. The same applies to the second electric motor, such that it can have the same design as the first electric motor.

In addition to the communication module, the actuator mounted on the electric motor also has a basis module for executing base functions relating to operating the electric motor, and a supplementary module for executing supplementary functions relating to operating the shift elements in the automatic transmission. These base functions are those functions necessary for operating the electric motor, e.g. commutation of the current fed to a stator and/or a rotor in the electric motor, rotational rate control, step control, and torque control. Other functions that may fall within the base functions can be executed by the basis module.

The supplementary functions are those functions lying outside the fundamental operation of the electric motor. In particular, the supplementary functions relate to activating the electric motor in a predetermined sequence, at a predetermined angle of rotation, with a predetermined torque, etc., wherein these sequences are necessary for shifting between the gear stages in the automatic transmission. In particular, the supplementary functions relate to a regulating or control strategy, e.g., stored in the memory in the actuator, which can be accessed by a runnable program. Accessing the functions can be triggered and terminated through external signals, data, or information.

The supplementary module in the actuator is configured to interact with the at least one other actuator under predetermined conditions via the communication module for executing corresponding supplementary functions on the at least one other electric motor. The actuator on the electric motor contains the communication module, which can communicate with the other actuator on the at least one other electric motor via the data bus. These aforementioned supplementary functions assigned to the actuator on the electric motor can affect the operation of the other electric motor.

A predetermined condition for the aforementioned interaction can comprise a malfunction in the at least one other actuator. Other conditions can be determined, e.g. a permanent or temporary interaction in which the temporary interaction can be triggered by an external signal.

Furthermore, a predetermined condition can be the absence of a supplementary module for executing supplementary functions in the at least one other actuator that relate to the operation of the shift elements in the automatic transmission. Depending on the design, the actuator for the electric motor can be configured in the factory such that it can be used to activate at least one other electric motor.

The actuator can be connected to the data bus via an external connector. A plug-in connector can be used for this, which can be unplugged. It is also conceivable to provide a permanent connection between the actuator and the data bus.

The actuator can be connected via the external connector to a supply line contained at least in part in the data bus such that it can be powered electrically. This electrical supply line in the data bus does not have to be entirely integrated in the data bus. It is also possible for the supply line to be simply parallel to the data bus, at least in part.

The actuator can contain an internal plug-in connector for establishing an electrical connection between the electric motor and the actuator that can be unplugged such that the actuator can be removed from the electric motor. A plug-in connector can be used for this that allows the actuator to be removed from the electric motor. Further elements for mounting the actuator on the electric motor may also be provided, e.g. screws, clips, etc. which allow for the actuator be removed from the electric motor.

According to one embodiment, there is a system for operating shift elements in an automatic transmission for a vehicle in which the system contains at least one electric motor according to the embodiment described above. The system can also contain at least one other electric motor that has an actuator with a communication module mounted on it. The communication module on the at least one electric motor and the communication module on the at least one second electric motor can be connected to one another for communication via the data bus.

The system for operating shift elements in an automatic transmission therefore contains at least two electric motors, each of which has an actuator, wherein the respective actuators can communicate via their communication modules with one another through the interconnected data bus. With this system it is possible to activate one of the two electric motors in the system with the other electric motor in the system, or to at least aid in this activation. This can be a permanent state or it can be triggered by external circumstances, e.g. if a control unit in one of the two electric motors malfunctions. In the latter case, the actuator for the electric motor that remains functional can assume the functions of the malfunctioning actuator.

As a result, functions of at least one of the actuators in the system can be made available to at least one other actuator in the system via the corresponding communication modules.

The system can theoretically comprise an arbitrary number of electric motors with actuators mounted thereon. The actuators can all, or in part, communicate with one another via the data bus. It is also possible with the system, which contains numerous electric motors with respective actuators, to equip an actuator for an electric motor with those functions that extend beyond those for the other actuators in the system. This means that a system can be provided in which one unit, comprised of an electric motor and an actuator, functions as the master unit, while the other units, comprised of an electric motor and actuator, function as slave units.

The system can be connected to a central control unit in the vehicle via the data bus, which issues commands to the respective actuators connected to the data bus. The functions of the central control unit in the vehicle can be quite simple if the functions are transferred to the actuator(s) for the electric motors in the system. It is likewise possible to form the system without a central control unit if all of the functions necessary for operating the electric motors are provided on the actuators for the electric motors in the system.

If the actuators for the electric motors in the system are identical in terms of their construction and functions, the actuators, or the unit on the electric motor and actuator can be particularly easily produced, and the elements can be exchanged among themselves, thus minimizing maintenance.

The number of electric motors in the system described above can be adapted to the application. There can be, e.g. three, four, five or more electric motors in the system.

FIG. 1 shows a schematic illustration of a system containing a number of electric motors that can be used for operating shift elements in an automatic transmission.

Embodiments of the invention shall be described below in reference to the drawing.

FIG. 1 shows the system with three electric motors 10, 20, 30. Each of the three electric motors has an actuator 12, 22, 32, which can be removably mounted on the respective electric motor 10, 20, 30. The construction of the electric motor 10 shall be explained below.

The electric motor 10 has an output shaft 11, which rotates when the electric motor 10 is running. The drive shaft 11 is coupled to a shift element (not shown) in an automatic transmission. The output shaft 11 is connected via a gearing or a rod to the shift element such that the rotation of the output shaft 11 is converted to a movement of the shift element.

The electric motor 10 is a brushless DC motor in the present embodiment. The actuator 12 is located on the side of the electric motor 10 opposite the output shaft. The actuator 12 has a printed circuit board 19 populated with various electronic components that are connected to one another electrically in accordance with a predefined circuitry. In addition to a memory (not shown) and a processor (not shown), the elements comprise a rotational rate sensor 15 and a communication module 14. The rotational rate sensor 15 is a Hall sensor in the present embodiment, which determines the rotation of the output shaft 11 for the electric motor 10 via the rotation of a sensor magnet 16 attached to the motor shaft. The signals from the rotational rate sensor 15 are processed accordingly by the actuator 12.

The communication module 14 contains functions for communication between the actuator 12 and external elements. The communication module 14 is connected to an external connector element 13. The external connector element 13 is a plug-in element, which is described below.

Furthermore, there is an internal connector element 18 on the actuator, which provides electricity to the electric motor 10 via a plug-in connection. The internal connector element 18 forms a connection between that actuator 12 and the electric motor 10 that can be disconnected.

The actuator is in a housing 19, formed as an injection molded component in the present embodiment. This housing 19 encompasses the elements of the actuator 12, such that external effects, e.g. caused by dust or moisture, are substantially prevented. A heat sink 17 is located on the side of the actuator 12 facing away from the electric motor 10, which discharges heat generated by the elements in the actuator when it is in operation. The heat sink 17 has fins to improve heat dissipation.

There are three identical electric motors 10, 20, 30 in the embodiment shown in FIG. 1. In particular, each of the actuators 12, 22, 32 has an external connector element 13, 23, 33. The units comprised of an electric motor and an actuator are mounted at positions when used in or on an automatic transmission that are suitable for operating the shift elements.

There is also a data bus 40 in FIG. 1 placed in the vehicle corresponding to the positions of the electric motors 10, 20, 30, which is connected to the external connector elements 13, 23, 33. There is an electrical supply line 40 that runs parallel to the data bus 40, which is likewise connected to the respective actuators via the external connector elements 13, 23, 33. Each external connector element 13, 23, 33 on each of the actuators 12, 22, 32 is designed such that both the connections for the data bus as well as the connections for the electrical supply line 41 are provided in a single connector element 13, 23, 33.

The data bus and the electrical supply line 41 are connected to a central control unit 50 in the vehicle. The central control unit 50 controls those functions necessary for operating the vehicle, as well as outputting signals to the corresponding actuators 12, 22, 32 via the data bus.

Each actuator 12, 22, 32 in the present embodiment is equipped with hardware and software such that base functions for operating the electric motors and supplementary functions for operating the shift elements are executed according to a strategy. The software runs automatically in the respective actuators 12, 22, 32 after a main switch in the vehicle is activated, and can therefore execute the base functions and the supplementary functions. These base functions comprise the commutation of the current supplied to the electric motor 10, such that the electric motor rotates. This base function also comprises a control of the rotational rate via rotational rate sensors 15 interacting with the sensor magnet 16.

The supplementary functions in the present embodiment comprise the operation of the electric motor in accordance with sequences determined in advance. In the present embodiment, such a sequence comprises a predetermined number of rotations of the output shaft 11, and potentially a subsequent predetermined number of rotations of the output shaft 11 in the opposite direction, in order to trigger the shifting procedure. A number of such sequences is stored in the memory for the respective actuator 12, 22, 23, such that each of the actuators 12, 22, 32 can execute both the base functions and the supplementary functions. A signal in the form of predetermined sequences that functions as the trigger for executing the supplementary functions is sent in the present embodiment from the central control unit 50 to the corresponding actuator 12, 22, 32 via the data bus 40. After receiving the signal, the actuator 12, 22, 32 executes the corresponding sequence by activating the electric motor 10, 20, 30.

The functions that are normally stored in the central control unit 50 are at least partially automatically executed by the respective actuator 12, 22, 32 in the present embodiment such that the functionality of the central control unit 50 can be simplified, resulting in a system with distributed intelligence. Furthermore, the actuators 12, 22, 32 are identical in the present embodiment, such that just one component needs to be developed and produced, thus resulting in lower production costs and simplifying maintenance.

In a modified embodiment it is likewise assumed that the units comprised of an electric motor 10, 20, 30 and an actuator 12, 22, 32, are substantially identical. Because of the communication between the respective actuators 12, 22, 32 and the data bus 40, the actuators 12, 22, 32 can exchange data among themselves via the respective communication modules 14, 24, 34. Using this function, obtained with software and hardware in the actuators 12, 22, 32, it is possible for one actuator 12, 22, 32 to assume the function of another actuator, if this actuator is malfunctioning. The hardware and software enable each of the functioning actuators 12, 22, 32 to determine whether any of the other actuators are not functioning. If this is the case, the software and hardware designed for this in one actuator assume the function of the defective actuator. By way of example, if the second actuator 22 is defective, its function is assumed by the first actuator 12, in which case a data exchange takes place between the first actuator 12 and the defective actuator 22 via the data bus. A prerequisite for this function is that the respective communication modules 14 and 24 are functioning.

In this manner, a system is provided in which the reliability is significantly improved because the function of a defective actuator can be assumed by an intact actuator.

In a modified embodiment, the units comprised of an electric motor 10, 20, 30 and an actuator 12, 22, 32 are not identical. In the present embodiment, the first unit, comprised of an electric motor and an actuator 12, is different from the other actuators 22 and 32. In particular, the first actuator 12, with the different construction, is assigned special functions, such that this actuator can be referred to as the master device. The other actuators 22 and 32 have simplified functionalities, such that they can be referred to as slave devices. In the present embodiment, a portion of the control and regulation of all of the electric motors 10, 20, 30 is assumed by the master device, because it has the expanded functionality. In particular, the master device has the supplementary functions described above, which can be made available to all of the other actuators via the communication between the actuators 12, 22, 32. As a result of the software and hardware in the master device, it is able to execute the supplementary functions on the other units in the system comprised of an electric motor and an actuator.

The overall construction is simplified with this embodiment, because only a small number of the units comprised of an electric motor and an actuator need to be equipped with the supplementary functions, while a larger number of the units comprised of an electric motor and an actuator in the system can have an extremely simple design.

REFERENCE SYMBOLS 10, 20, 30 electric motor
11, 21, 31 output shaft
12, 22, 32 actuator
13, 23, 33 external connector element
14, 24, 34 communication module
15, 25, 35 rotational rate sensor
16, 26, 36 sensor magnet
17, 27, 37 heat sink
18, 28, 38 internal connector element
19, 29, 39 housing
40 data bus
41 electrical supply line
50 central control unit

The invention claimed is:

1. An electric motor for operating shift elements in an automatic transmission for a vehicle, the electric motor comprising:
   an actuator mounted on the electric motor for operating the electric motor, which actuator is configured to be coupled to a data bus for communication, wherein the actuator contains a communication module configured to communicate with at least one other actuator configured to be coupled to the data bus for communication in at least one other electric motor;
   wherein the actuator mounted on the electric motor further comprises:
      a basis module configured to execute base functions relating to the operation of the electric motor; and
      a supplementary module configured to:
         execute supplementary functions relating to an operation of shift elements in the automatic transmission, and interact with the at least one other actuator via the communication module under predetermined conditions to execute corresponding supplementary functions in the at least one other electric motor.

2. The electric motor according to claim 1, wherein at least one of the predetermined conditions comprises a malfunctioning of the at least one other actuator.

3. The electric motor according to claim 1, wherein at least one of the predetermined conditions comprises and absence of a supplementary module for executing supplementary functions relating to the operation of the shift elements in the automatic transmission in the at least one other actuator.

4. The electric motor according to claim 1, wherein the actuator is configured to be connected to the data bus via an external connector element.

5. The electric motor according to claim 4, wherein the actuator is configured to be connected to an electrical supply line, contained at least partially in the data bus, via the external connector element.

6. The electric motor according to claim 1 wherein the actuator contains an internal plug-in connector configured to obtain an electrical connection between the electric motor and the actuator, that can be disconnected to remove the actuator from the electric motor.

7. A system for operating shift elements in an automatic transmission for a vehicle, wherein the system comprises:
at least one electric motor according to claim 1, and
the at least one other electric motor further comprising an actuator mounted thereon that contains a communication module, wherein the communication module in the at least one electric motor and the communications module in the at least one other electric motor can be connected to one another for communication via a data bus.

8. The system for operating shift elements in an automatic transmission for a vehicle according to claim 7, wherein functions of at least one of the actuators in the system can be made available to at least one other actuator in the system.

* * * * *